United States Patent [19]

Itoh et al.

[11] Patent Number: 6,008,310
[45] Date of Patent: *Dec. 28, 1999

[54] SILICONE RELEASE COATING COMPOSITIONS

[75] Inventors: Maki Itoh, Kanagawa; Akihito Sakakibara-Saitoh, Shizuoka; Michitaka Suto, Kanagawa; Takateru Yamada, Chiba Prefecture, all of Japan

[73] Assignees: Dow Corning Asia, Ltd., Tokyo, Japan; Dow Corning Toray Silicone, Tokyo, Japan

[ * ] Notice: This patent is subject to a terminal disclaimer.

[21] Appl. No.: 09/028,332

[22] Filed: Feb. 24, 1998

[30] Foreign Application Priority Data

Feb. 24, 1997 [JP] Japan .................................... 9-039497

[51] Int. Cl.$^6$ .................................................. C08G 77/12
[52] U.S. Cl. ............................... 528/31; 528/15; 528/32; 525/477; 525/478; 524/731; 524/715; 524/768; 524/848; 524/862
[58] Field of Search .................................. 528/15, 31, 32; 525/477, 478; 524/731, 715, 768, 848, 862

[56] References Cited

U.S. PATENT DOCUMENTS 4,399,266  8/1983  Matsumura et al. ..................... 528/10

FOREIGN PATENT DOCUMENTS

| | | |
|---|---|---|
| 868996 | 11/1968 | Canada . |
| 0406911 | 1/1991 | European Pat. Off. . |
| 49-27033 | 7/1974 | Japan . |
| 59-84953 | 5/1984 | Japan . |
| 60-17214 | 5/1985 | Japan . |
| 61-221232 | 10/1986 | Japan . |
| 62-16212 | 4/1987 | Japan . |
| 1-43773 | 9/1989 | Japan . |
| 3-20331 | 1/1991 | Japan . |
| 3-227321 | 10/1991 | Japan . |
| 5-125187 | 5/1993 | Japan . |
| 6-279586 | 10/1994 | Japan . |
| 6-287307 | 10/1994 | Japan . |
| 7-70321 | 3/1995 | Japan . |
| 7-208087 | 8/1995 | Japan . |
| 7-208143 | 8/1995 | Japan . |

OTHER PUBLICATIONS

"Shirikoon Handobukke" (Silicone Handbook), edited by Kunio Itoh, published by Nikkan Kogyo Shinbunsha 1990.
J. Am. Chem. Soc., 1990, vol. 112, pp. 1931–1936.
Chem. Rev., 1995, vol. 95, pp. 1409–1430.

Primary Examiner—David W. Wu
Assistant Examiner—Carixia Lu-Rutt
Attorney, Agent, or Firm—Timothy J. Troy

[57] ABSTRACT

This invention relates to a silicone release coating comprising (A) an organopolysiloxane having at least two crosslinkable carbon-carbon double bonds in each molecule, (B) an organopolysiloxane having at least two Si-bonded hydrogen atoms in each molecule, (C) a silylated polymethylsilsesquioxane and (D) platinum catalyst. The silicone release coating compositions of this invention can further comprise an inhibitor. The silicone release coating compositions of this invention do not decline in release resistance due to release paper aging or release liner aging.

26 Claims, No Drawings

SILICONE RELEASE COATING COMPOSITIONS

FIELD OF THE INVENTION

This invention relates to silicone release coating compositions.

BACKGROUND OF THE INVENTION

Silicone resins that contain 1.5 oxygen atoms per silicon atom are generically known as polysilsesquioxanes. Polysilsesquioxanes are highly heat resistant and exhibit good electrical insulation properties and flame retardancy, and this good property spectrum has resulted in their use as resist materials and interlayer dielectric films in semiconductor fabrication (for example, see, "Shirikoon Handobukku" (English title: Silicone Handbook), edited by Kunio Itoh, published by Nikkan Kogyo Shinbunsha (1990)).

Methods are known for the synthesis of polymethylsilsesquioxanes. For example, polymethylsilsesquioxane can be synthesized by dissolving methyltrichlorosilane in the presence of an amine in a single solvent or mixture of solvents selected from ketones and ethers, adding water to this system dropwise to effect hydrolysis, and then heating to effect condensation such as is disclosed in Japanese Patent Publication Nos. 60-17214 (17,214/1985) and 1-43773 (43,773/1989), and in U.S. Pat. No. 4,399,266. Another synthesis example is taught in EP 0 406 911 and Japanese Patent Publication No. 62-16212 (16,212/1987) which teach the dissolution of a trifunctional methylsilane in organic solvent, then hydrolysis by the dropwise addition of water to this solution at a temperature from −20° C. to −50° C. under an inert gas pressure of 1,000 to 3,000 Pa, and thereafter condensation by heating. Yet another synthesis example is disclosed in Japanese Patent Application Laid Open No. 3-20331 (20,331/1991) which teaches the reaction in organic solvent of methyltriacetoxysilane with an equivalent amount of alcohol and/or water to synthesize the alkoxyacetoxysilane, polycondensation of the alkoxyacetoxysilane in organic solvent in the presence of sodium bicarbonate to give a prepolymer, and condensation of this prepolymer by heating in the presence of at least 1 catalyst selected from the alkali metal hydroxides, alkaline-earth metal hydroxides, alkali metal fluorides, alkaline-earth metal fluorides, and triethylamine. Still another synthesis example is found in Japanese Patent Application Laid Open No. 3-227321 (227,321/1991) which teaches the dissolution of alkali metal carboxylate and lower alcohol in a mixed liquid system that forms two phases (water and hydrocarbon solvent), the dropwise addition of methyltrihalosilane into this system to effect hydrolysis, and condensation by heating.

The polymethylsilsesquioxanes afforded by these methods are hard but brittle. Japanese Patent Publication No. 1-43773 further discloses that regulating the fraction with molecular weight $\leq$20,000 (molecular weight as determined by gel permeation chromatography (GPC) calibrated with polystyrene standards) to 15 to 30 weight % of the polymethylsilsesquioxane. However, even this does no more than enable the preparation of coatings with thicknesses of about 1.8 to 2.0 $\mu$m. Similarly, the technology in EP 0 406 911 can only provide coatings with maximum thicknesses of 3 to 3.5 $\mu$m without cracking. At larger film thicknesses cracking occurs, and of course the flexibility that would permit the fabrication of an independent or stand-alone film is absent.

We have already discovered and have taught in Japanese Patent Application Nos. 7-208087 (208,087/1995) and 7-208143 (208,143/1995) that a coating that combines flexibility with high thermal stability is provided by the cure of a polymethylsilsesquioxane having a molecular weight and hydroxyl content in specific ranges and preferably prepared by a special method.

On the subject of the silylation of the residual silanol in polysilsesquioxane, a synthetic method for this is disclosed in, for example, *J. Am. Chem. Soc.,* 1990, Volume 112, pages 1931 to 1936. Japanese Patent Application Laid Open No. 61-221232 (221,232/1986) teaches a method for the preparation of silylated polysilsesquioxane comprising the use of silylating agent to terminate the reaction in the polysilsesquioxane synthesis methods of EP 0 406 911 and Japanese Patent Publication No. 62-16212. Japanese Patent Application Laid Open Nos. 6-279586 (279,586/1994), 6-287307 (287,307/1994), and 7-70321 (70,321/1995) teach that stabilization can be achieved and gelation can be avoided by trimethylsilylation of the silanol in polysilsesquioxane in which methyl constitutes 50 to 99.9 mole % of the pendant organic groups and crosslinking-reactive groups are present in the remaining organic groups. However, even without silylation the polymethylsilsesquioxane disclosed by us in Japanese Patent Application Nos. 7-208087 and 7-208143 does not gel during its preparation and can be stably stored at room temperature. Japanese Patent Application Laid Open No. 5-125187 (125,187/1993) teaches that an increased storage stability can be obtained by trialkylsilylation of the silanol in polysilsesquioxane having a number average molecular weight (Mn) $\geq$100,000 and methyl as 50 to 100 mole % of its pendant organic groups. Japanese Patent Publication No. 62-16212 also teaches that silylation of the silanol in polymethylsilsesquioxane improves stability.

Organic groups in polyorganosilsesquioxanes, and polyorganosilsesquioxanes functionalized with various crosslinking-reactive groups are described in, for example, *Chem. Rev.,* 1995, Volume 95, pages 1409 to 1430.

As is already well known, the release of various tacky or sticky substances can be facilitated and substrate blocking can be prevented by coating a polyorganosiloxane-based release coating composition on a substrate such as paper or plastic film, and curing the composition by a condensation or hydrosilylation reaction.

A problem generally encountered with the polyorganosiloxane-based release coating compositions has been the extremely low release resistance of the cured release coatings provided by the cure of these compositions. This has led to the addition of controlled release additives to these compositions in order to adjust the release resistance. The heretofore proposed controlled release additives are exemplified by MQ silicone resins comprising $R^7{}_3SiO_{1/2}$ units wherein $R^7$ is a monovalent hydrocarbon group containing no more than 2 carbons and $SiO_{4/2}$ units as is disclosed in Japanese Patent Publication No. 49-27033 (27,033/1974) and Japanese Patent Application Laid Open No. 59-84953 (84,953/1984)) and MQ silicone resins comprising $R^7{}_3SiO_{1/2}$ units, $(CH_2=CH)R^7{}_2SiO_{1/2}$ units, and $SiO_{4/2}$ units as is disclosed in Japanese Patent Publication No. 53-29678 (29,678/1978). However, even with the use of controlled release additives as described above, the release resistance of the cured coating can undergo a substantial decline due to release paper aging or release liner aging.

SUMMARY OF THE INVENTION

The present invention relates to a silicone release coating composition comprising (A) an organopolysiloxane having at least 2 crosslinkable carbon-carbon double bonds in each molecule, (B) an organopolysiloxane having at least 2 silicon-bonded hydrogen atoms in each molecule, (C) a silylated polymethylsilsesquioxane, and (D) a catalytic quantity of a platinum catalyst.

It is an object of the present invention to provide a silicone release coating composition that does not decline in release resistance due to release paper aging or release liner aging.

BRIEF DESCRIPTION OF THE DRAWINGS

FIG. 1 contains a graph that shows the ranges of m and n for the polymethylsilsesquioxane $(CH_3SiO_{3/2})_n(CH_3Si(OH)O_{2/2})_m$ used in the present invention.

DETAILED DESCRIPTION OF THE INVENTION

The present invention relates to a silicone release coating composition comprising (A) 100 weight parts of an organopolysiloxane having a viscosity at 25° C. of at least 40 millipascal-seconds (mPa.s) (1 mPa.s=1 centipoise) and having at least 2 crosslinkable carbon-carbon double bonds in each molecule, (B) 0.5 to 20 weight parts of an organopolysiloxane having a viscosity at 25° C. of 1 to 1,000 mPa.s and having at least 2 silicon-bonded hydrogen atoms in each molecule, (C) 1 to 90 weight parts of a silylated polymethylsilsesquioxane obtained by a method comprising silylating a starting polymethylsilsesquioxane having a predetermined number average molecular weight, Mn, from 380 to 2,000 as determined by gel permeation chromatography calibrated with polystyrene standards, said starting polymethylsilsesquioxane having the formula $$(CH_3SiO_{3/2})_n(CH_3Si(OH)O_{2/2})_m$$

wherein m and n are positive numbers that provide the predetermined Mn, with the proviso that the value of m/(m+n) is less than or equal to $0.152/(Mn \times 10^{-3})+0.10$ and greater than or equal to $0.034/(Mn \times 10^{-3})$, said silylated polymethylsilsesquioxane having the formula $$(CH_3SiO_{3/2})_n(CH_3Si(OH)O_{2/2})_{m-k}(CH_3Si(OSiR^1R^2R^3)O_{2/2})_k$$

wherein k is a positive number less than m, (m−k)/(m+n) is less than or equal to 0.12, and $R^1$, $R^2$, and $R^3$ are each selected from substituted and unsubstituted monovalent hydrocarbon groups wherein at least 1 of said $R^1$, $R^2$, and $R^3$ is a group containing a crosslinkable carbon-carbon double bond, and (D) a catalytic quantity of a platinum catalyst.

The organopolysiloxane (A) has a viscosity at 25° C. of at least 40 mPa.s and contains at least 2 crosslinkable carbon-carbon double bond groups in each molecule. This organopolysiloxane is exemplified by a monomer unit having the formula $R^8_aR^9_bSiO_{(4-a-b)/2}$ in which $R^8$ denotes a crosslinkable C=C-functional monovalent hydrocarbon group, $R^9$ denotes monovalent hydrocarbon groups free of crosslinkable carbon-carbon double bonds, a is a number that provides at least two $R^8$ groups in each molecule, and $1.8 \leq a+b \leq 2.3$. The group $R^8$ is exemplified by vinyl and hexenyl groups and the group $R^9$ is exemplified by methyl and phenyl groups. Component (A) must have a viscosity at 25° C. of at least 40 mPa.s because viscosities lower than this result in excessively large infiltration of the corresponding release coating composition into the substrate. Gums can be used as component (A), and their viscosity defines the upper limit on the viscosity range for component (A). When the composition according to the present invention is formulated as a solventless composition, the viscosity of component (A) at 25° C. is preferably in the range from 40 to 10,000 mPa.s and particularly preferably is in the range from 100 to 5,000 mPa.s. When the composition according to the present invention is formulated as a solvent-based composition, the viscosity of component (A) at 25° C. is preferably in the range from 100,000 mPa.s to that of a gum and particularly preferably is in the range from 500,000 mPa.s to that of a gum. Preferably component (A) is selected from the group consisting of trimethylsiloxy-terminated dimethylsiloxane-methylvinylsiloxane copolymers, vinyldimethylsiloxy-terminated dimethylsiloxane-methylvinylsiloxane copolymers, trimethylsiloxy-terminated dimethylsiloxane-methylhexenylsiloxane copolymers, hexenyldimethylsiloxy-terminated dimethylsiloxane-methylhexenylsiloxane copolymers, dimethylsiloxane-methylvinylsiloxane-methylphenylsiloxane copolymers, hexenyldimethylsiloxy-terminated dimethylsiloxane-methylhexenylsiloxane-methylphenylsiloxane copolymers, trimethylsiloxy-terminated dimethylsiloxane-methylhexenylsiloxane-methylphenylsiloxane copolymers, vinyldimethylsiloxy-terminated dimethylpolysiloxanes, and hexenyldimethylsiloxy-terminated dimethylpolysiloxanes.

The organopolysiloxane (B), which functions as a crosslinker, should have a viscosity at 25° C. from 1 to 1,000 mPa.s and should carry at least 2 silicon-bonded hydrogen atoms in each molecule. This organopolysiloxane can be defined by the monomer unit general formula $H_cR^{10}_dSiO_{(4-c-d)/2}$ in which $R^{10}$ denotes monovalent hydrocarbon groups exemplified by methyl and phenyl, c is a number that provides at least two hydrogen atoms in each molecule, and $1.8 \leq c+d \leq 2.3$. The viscosity of component (B) at 25° C. must be from 1 to 1,000 mPa.s and is preferably from 5 to 500 mPa.s. Component (B) with a viscosity at 25° C. below 1 mPa.s has a strong tendency to volatilize, which causes the corresponding release coating composition to be unstable. Viscosities in excess of 1,000 mPa.s result in lengthy cure times for the corresponding release coating composition and diminished releasability by the ultimately obtained cured release coating. Preferably component (B) is selected from the group consisting of dimethylhydrogensiloxy-terminated dimethylsiloxane-methylhydrogensiloxane copolymers, trimethylsiloxy-terminated dimethylsiloxane-methylhydrogensiloxane copolymers, trimethylsiloxy-terminated methylhydrogenpolysiloxanes, cyclic methylhydrogensiloxanes, copolymers comprising methylhydrogensiloxy units and $SiO_2$ units.

Component (B) is used at from 0.5 to 20 weight parts and preferably at from 1 to 10 weight parts per 100 weight parts component (A). The use of less than 0.5 weight part component (B) per 100 weight parts component (A) results in an unacceptable cure by the corresponding release coating composition. The use of more than 20 weight parts (B) per 100 weight parts (A) results in diminished releasability by the ultimately obtained cured release coating.

Component (C) is silylated polymethylsilsesquioxane with the formula $$(CH_3SiO_{3/2})_n(CH_3Si(OH)O_{2/2})_{m-k}(CH_3Si(OSiR^1R^2R^3)O_{2/2})_k$$

wherein k is a positive number less than m, (m−k)/(m+n) is less than or equal to 0.12 and $R^1$, $R^2$, and $R^3$ are each selected from substituted and unsubstituted monovalent hydrocarbon groups wherein at least 1 of said $R^1$, $R^2$, and $R^3$ is a group containing a crosslinkable carbon-carbon double bond, that is obtained by a method comprising silylating the silanol in a starting polymethylsilsesquioxane having the formula $$(CH_3SiO_{3/2})_n(CH_3Si(OH)O_{2/2})_m$$

having a predetermined number average molecular weight (Mn), from 380 to 2,000 as determined by gel permeation chromatography calibrated with polystyrene standards wherein m and n are positive numbers that provide the predetermined Mn and the value of m/(m+n) falls within region A in FIG. 1 wherein said region A is the region enclosed by the straight lines with equations (1) to (4) in the graph in FIG. 1 in which the x-axis plots $1/(Mn \times 10^{-3})$ and the y-axis plots m/(m+n) and said region A includes the intersections of the straight lines and the points on said straight lines defined by the following equations:

$$m/(m+n)=0.152/(Mn \times 10^{-3})+0.10 \quad (1)$$

$$1/(Mn \times 10^{-3})=1000/2000 \quad (2)$$

$$1/(Mn \times 10^{-3})=1000/380 \quad (3)$$

$$m/(m+n)=0.034/(Mn \times 10^{-3}) \quad (4).$$

This starting polymethylsilsesquioxane is preferably prepared in a two-phase system of water and organic solvent comprising oxygenated organic solvent and possibly up to 50 volume % (based on the oxygenated organic solvent) hydrocarbon solvent by hydrolyzing the methyltrihalosilane $MeSiX_3$ (Me=methyl and X=halogen atom) and condensing the resulting hydrolysis product.

Optimal methods for synthesizing the starting polymethylsilsesquioxane having a molecular weight and silanol content in the above-specified ranges are exemplified by the following: (1) forming a two-phase system of water (optionally containing the dissolved salt of a weak acid with a buffering capacity or a dissolved water-soluble inorganic base) and oxygenated organic solvent optionally containing no more than 50 volume % hydrocarbon solvent, adding the below-described (A) or (B) dropwise to this system to hydrolyze the methyltrihalosilane, and effecting condensation of the resulting hydrolysis product, wherein (A) is the methyltrihalosilane $MeSiX_3$ (Me=methyl and X=halogen atom) and (B) is the solution afforded by dissolving such a methyltrihalosilane in oxygenated organic solvent optionally containing no more than 50 volume % hydrocarbon solvent, (2) the same method as described under (1), but in this case effecting reaction in the two-phase system resulting from the dropwise addition of the solution described in (B) to only water, (3) the same method as described under (1), but in this case effecting reaction in the two-phase system resulting from the simultaneous dropwise addition of water and the solution described in (B) to an empty reactor.

X in the subject methyltrihalosilane is preferably bromine or chlorine and more preferably is chlorine. As used herein, the formation of a two-phase system of water and organic solvent refers to a state in which the water and organic solvent are not miscible and hence will not form a homogeneous solution. This includes the maintenance of a layered state by the organic layer and water layer through the use of slow-speed stirring as well as the generation of a suspension by vigorous stirring. Below the former is referred to as the "formation of two layers".

The organic solvent used in the subject preparative methods is an oxygenated organic solvent that can dissolve the methyltrihalosilane and, although possibly evidencing some solubility in water, can nevertheless form a two-phase system with water. The organic solvent can contain up to 50 volume % hydrocarbon solvent. The use of more than 50 volume % hydrocarbon solvent is impractical because this causes gel production to increase at the expense of the yield of target product. Even an organic solvent with an unlimited solubility in water can be used when such a solvent is not miscible with the aqueous solution of a water-soluble inorganic base or with the aqueous solution of a weak acid salt with a buffering capacity.

The oxygenated organic solvents are exemplified by, but not limited to, ketone solvents such as methyl ethyl ketone, diethyl ketone, methyl isobutyl ketone, acetylacetone, and cyclohexanone, ether solvents such as diethyl ether, di-n-propyl ether, dioxane, the dimethyl ether of diethylene glycol, and tetrahydrofuran, ester solvents such as ethyl acetate, butyl acetate, and butyl propionate, and alcohol solvents such as n-butanol, and hexanol. The ketone, ether, and alcohol solvents are particularly preferred among the preceding. The oxygenated organic solvent may also take the form of a mixture of two or more selections from the preceding. The hydrocarbon solvent is exemplified by, but again not limited to, aromatic hydrocarbon solvents such as benzene, toluene, and xylene, aliphatic hydrocarbon solvents such as hexane and heptane, and halogenated hydrocarbon solvents such as chloroform, trichloroethylene, and carbon tetrachloride. The quantity of the organic solvent is not critical, but preferably is in the range from 50 to 2,000 weight parts per 100 weight parts of the methyltrihalosilane. The use of less than 50 weight parts organic solvent per 100 weight parts methyltrihalosilane is inadequate for dissolving the polymethylsilsesquioxane product and, depending on the circumstances, will not give polymethylsilsesquioxane in the desired molecular weight range due to an overly high molecular weight. The use of more than 2,000 weight parts organic solvent can lead to slow development of hydrolysis of the methyltrihalosilane and condensation and hence to the failure to obtain polymethylsilsesquioxane in the desired molecular weight range. While the quantity of water used is also not critical, the water is preferably used at from 10 to 3,000 weight parts per 100 weight parts methyltrihalosilane.

Reaction is possible even with the use of entirely additive-free water as the aqueous phase, however, such a system will give a polymethylsilsesquioxane product with an elevated molecular weight since the reaction is accelerated by the hydrogen halide evolved from the methyltrihalosilane. Polymethylsilsesquioxane with a relatively lower molecular weight can therefore be synthesized through the addition of an acidity-controlling water-soluble inorganic base or buffering weak acid salt.

Such water-soluble inorganic bases are exemplified by water-soluble alkalis such as the lithium, sodium, potassium, calcium, and magnesium hydroxides. The subject weak acid salt with a buffering capacity is exemplified by, but not limited to, carbonates such as the sodium, potassium, calcium, and magnesium carbonates, bicarbonates such as the sodium and potassium bicarbonates, oxalates such as potassium trihydrogen bis(oxalate), carboxylates such as potassium hydrogen phthalate and sodium acetate, phosphates such as disodium hydrogen phosphate and potassium dihydrogen phosphate, and borates such as sodium tetraborate. These are preferably used at $\leq 1.8$ gram-equivalents per 1 mole halogen atom from the trihalosilane molecule. In other words, these are preferably used at up to 1.8 times the quantity that just neutralizes the hydrogen halide that is produced when the halosilane is completely hydrolyzed. The use of larger amounts facilitates the production of insoluble gel. Mixtures of two or more of the water-soluble inorganic bases and mixtures of two or more of the buffering weak acid salts can be used as long as the total is within the above-specified quantity range.

The methyltrihalosilane hydrolysis reaction bath can be stirred slowly at a rate that maintains two layers (aqueous phase and organic solvent) or can be strongly stirred so as to give a suspension. The reaction temperature is suitably in the range from room temperature (20° C.) to 120° C. and is preferably from about 40° C. to 100° C.

The starting polymethylsilsesquioxane used in the present invention may contain small amounts of units that originate from impurities that may be present in its precursors, for example, units bearing non-methyl lower alkyl, monofunctional units as represented by $R_3SiO_{1/2}$, difunctional units as represented by $R_2SiO_{2/2}$, and tetrafunctional units as represented by $SiO_{4/2}$. In addition, while the precursor polymethylsilsesquioxane under consideration contains the silanol group and has the structure specified by the structural formula given above, it may also contain very low levels of silanol-functional units with structures other than that specified in the said structural formula. Thus, while the precursor polymethylsilsesquioxane used in the present invention has a structure that satisfies the conditions specified hereinabove, it may also contain structural units generated by the causes outlined above within a range that does not impair the characteristic features of said precursor polymethylsilsesquioxane.

The $R^1$, $R^2$, and $R^3$ in the silyl group that silylates the silanol in the precursor polymethylsilsesquioxane are each selected from substituted and unsubstituted monovalent hydrocarbon groups on the condition that at least one of $R^1$, $R^2$, and $R^3$ contains a crosslinkable carbon-carbon double bond. The group containing a crosslinkable carbon-carbon double bond group is exemplified by vinyl, allyl, (meth) acryloxypropyl, and 5-hexenyl. The remaining nonreactive group or groups can be exemplified by alkyl such as methyl, ethyl, and propyl, aryl such as phenyl, and these organic groups carrying halogen substituents.

The technique for silylating the hydroxyl in the precursor polymethylsilsesquioxane with a reactive substituent-bearing silyl group is exemplified by reaction with halosilane bearing the three substituents $R^1$, $R^2$, and $R^3$ described above, use of a nitrogenous silylating agent such as, for example, N,N-diethylaminosilane, N-silylacetamide, or hexasubstituted disilazane, reaction with a trisubstituted silanol, and reaction with hexasubstituted disiloxane in a weakly acidic milieu. When halosilane is employed, a base can also be present in the system in order to neutralize the hydrogen halide by-product. In the case of reaction with a nitrogenous silylating agent, a catalyst such as trimethylchlorosilane or ammonium sulfate can be added. The silylation reaction under consideration can be run in the presence or absence of solvent. Solvents suitable for this reaction are, for example, aromatic hydrocarbon solvents such as benzene, toluene, and xylene, aliphatic hydrocarbon solvents such as hexane and heptane, ether solvents such as diethyl ether and tetrahydrofuran, ketone solvents such as acetone and methyl ethyl ketone, ester solvents such as ethyl acetate and butyl acetate, halogenated hydrocarbon solvents such as chloroform, trichloroethylene, and carbon tetrachloride, dimethylformamide, and dimethyl sulfoxide.

The subject silylation reaction is suitably run at from 0° C. to 200° C. and preferably at from 0° C. to 140° C.

The aforementioned $R^1$, $R^2$, and $R^3$ preferably comprise 1 or more selections from the following: (i) $R^1$ and $R^2$=methyl, $R^3$=vinyl, $R^1$ and $R^2$=methyl, $R^3$=5-hexenyl.

Component (C) is added at from 1 to 90 weight parts and preferably at from 2 to 80 weight parts, in each case per 100 weight parts of component (A).

The platinum catalyst (D) is exemplified by chloroplatinic acid, diketone complexes of chloroplatinic acid, olefin complexes of chloroplatinic acid, alcohol-modified chloroplatinic acid, microfinely divided platinum on a silica carrier, platinum-divinyltetramethyldisiloxane complexes, and platinum on carbon. Component (D) need only be added in a catalytic quantity and its quantity of addition is not otherwise critical. Component (D) in general will be added in a quantity that provides from 1 to 1,000 ppm platinum metal based on the weight of component (A).

The silicone release coating compositions of this invention comprise components (A) to (D) described above, but may in addition contain a silylated polymethylsilsesquioxane (E) having the formula

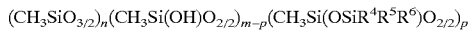

wherein p is a positive number less than m, the quantity of residual silanol as calculated by (m–p)/(m+n) is less than or equal to 0.12, and at least one of $R^4$, $R^5$, and $R^6$ is a hydrogen atom with the remainder being selected from substituted and unsubstituted monovalent hydrocarbon groups as afforded by silylation of the silanol in the starting polymethylsilsesquioxane having the same description as the starting polymethylsilsesquioxane for component (C).

At least one of the $R^4$, $R^5$, and $R^6$ must be a hydrogen atom in the silyl group of the silylating agent used to silylate the silanol in the starting polymethylsilsesquioxane with any remaining groups being selected from substituted and unsubstituted monovalent hydrocarbon groups. The technique for running the silylation reaction in this case may be the same as for component (C). Component (E) is added at from 1 to 90 weight parts and preferably at from 2 to 80 weight parts, in each case per 100 weight parts component (A).

The $R^1$ to $R^6$ groups in the silicone release coating composition comprising components (A) to (E) are preferably as follows: where $R^1$, $R^2$, $R^4$, and $R^5$ are methyl, $R^3$ is vinyl, and $R^6$ is a hydrogen atom, or where $R^1$, $R^2$, $R^4$, and $R^5$ are methyl, $R^3$ is 5-hexenyl, and $R^6$ is a hydrogen atom.

A curing reaction inhibitor is preferably added to the silicone release coating composition of this invention in order to provide it with storage stability at room temperature. The inhibitor is exemplified by alkyne alcohols such as 3-methyl-1-butyn-3-ol, 3,5-dimethyl-1-hexyn-3-ol, and phenylbutynol, ene-yne compounds such as 3-methyl-3-penten-1-yne and 3,5-dimethyl-3-hexen-1-yne, tetramethyltetrahexenylcyclotetrasiloxane; and benzotriazole. This component should be used in sufficient quantity to provide a practical pot life (use time). While the cure-inhibiting activity of this component will vary with its molecular structure, in general it will be added at from 0.001 to 5 weight parts per 100 weight parts component (A).

Components that may be present in the release coating composition of this invention on an optional basis are exemplified by organic solvents, adhesion promoters, colorants, pigments, and silica micropowder. The use of organic solvent improves the storage stability of the composition of this invention and also improves its coatability on various substrates. The organic solvent is not critical as long as it is capable of dissolving the composition according to the present invention to give a homogeneous solution. The organic solvent is exemplified by the aromatic hydrocarbon solvents, aliphatic hydrocarbon solvents, halogenated hydrocarbon solvents, ketone solvents, ether solvent solvents, and ester solvents listed above.

The conditions for curing the silicone release coating composition of this invention are not critical, but in general the composition will be cured at temperatures in the range from 50° C. to 200° C.

EXAMPLES

The present invention is explained in greater detail in the following through working and comparative examples, but is not limited to these examples.

Methodology for Evaluating the Release Resistance of the Cured Release Coatings

An approximately 5 weight % toluene solution of the silicone release coating composition was prepared, and high-quality polyethylene-laminated paper was coated with this solution so as to give a dry coating weight of 0.6 g/m². Curing was then carried out by heating in a forced-convection oven for 30 seconds at 150° C. to give the cured release coating. Release paper aging was carried out with the cured coating thus obtained for 1 day either at room temperature or 70° C. (release paper aging at 70° C. was intended as accelerated testing). An acrylic pressure-sensitive adhesive (BPS5127 from Toyo Ink Mfg. Co., Ltd.) was subsequently applied on the cured release coating so as to provide a film thickness at the time of application of 70 μm. Application of the adhesive was followed by drying by heating for 2 minutes at 70° C. and then the application of coated paper. A 20 gf/cm² load was applied to the laminate and the assembly was then held for 3 days at 25° C. /60% humidity. The laminate was subsequently cut to give a 5-cm strip and the strip was peeled at 180° using a tensile tester in order to measure the release resistance.

Reference Example 1

2 L of water and 1.5 L of methyl isobutyl ketone were introduced into a reactor equipped with a reflux condenser, addition funnel, and stirrer and were stirred with sufficient vigor that 2 layers did not form. Next, 745 g (5.0 mol) of methyltrichlorosilane dissolved in 0.5 L of methyl isobutyl ketone was gradually added dropwise at a rate such that the temperature of the reaction mixture did not exceed 50° C. The reaction mixture was then additionally stirred and heated for 2 hours on an oil bath at 50° C. After completion of the reaction, the organic layer was washed with water until the wash water reached neutrality and was then dried over a drying agent. The drying agent was subsequently removed and the solvent was distilled off at reduced pressure. Drying overnight in a vacuum then gave polymethylsilsesquioxane as a white solid. The following results were obtained when the molecular weight distribution of this polymethylsilsesquioxane was measured by GPC calibrated with polystyrene standards (solvent=chloroform, columns= 2×TSKgelGMH$_{HR}$-L (brand name) from Tosoh, instrument= HLC-8020 from Tosoh): weight-average molecular weight= 9,180; number-average molecular weight=1,060. The silanol group content as determined from the $^{29}$Si-NMR spectrum (measured with an ACP-300 from Bruker) was 0.22 per silicon atom (this 0.22 corresponded to the value of m/(m+n)).

The interior atmosphere of a reactor equipped with a reflux condenser, addition funnel, and stirrer was replaced with argon and 70 g of the polymethylsilsesquioxane described above was dissolved in 210 mL of methyl isobutyl ketone in the reactor. 41.0 g of vinyldimethylchlorosilane was added dropwise over 3 minutes on an ice bath and the reaction was then continued for 1 hour at room temperature. After terminating the reaction by the addition of water, the organic layer was washed with water until the wash water reached neutrality. The organic layer was then dried over a drying agent. The drying agent was removed and the solvent was distilled off under reduced pressure. Drying in a vacuum for 2 days gave 71.6 g of vinyldimethylsilylated polymethylsilsesquioxane as a solid with a very slight fluidity. The residual silanol content as calculated from the $^{29}$Si-NMR spectrum was 0.05 per silicon atom in the silsesquioxane skeleton (this 0.05 corresponded to the value of (m−k)/(m+n)).

Example 1

The following were mixed to homogeneity: 100 weight parts of trimethylsiloxy-endblocked dimethylsiloxane-methylvinylsiloxane copolymer gum with a vinyl content of 0.9 weight % (viscosity of the 30% toluene solution=13,000 mPa.s), 3.6 weight parts of trimethylsiloxy-endblocked methylhydrogenpolysiloxane with a viscosity of 10 centipoise, 9.1 weight parts of the vinyldimethylsilylated polymethylsilsesquioxane described in Reference Example 1, 1.0 weight part of 2-methyl-3-butyn-2-ol, and 2,066 weight parts of toluene. A silicone release coating composition was prepared by the addition to the preceding mixture with mixing to homogeneity of a platinum-divinyltetramethyldisiloxane complex in sufficient quantity to provide 100 ppm platinum metal based on the weight of the dimethylsiloxane-methylvinylsiloxane copolymer. The release resistance was measured on the cured release coating prepared from this composition, and the results are reported in Table 1.

Example 2

A silicone release coating composition was prepared according to Example 1, but in this case using 20 weight parts of the vinyldimethylsilylated polymethylsilsesquioxane from Reference Example 1 and 4.0 weight parts of the methylhydrogenpolysiloxane. The release resistance was measured on the cured release coating prepared from this composition, and the results are reported in Table 1.

Comparative Example 1

A silicone release coating composition was prepared according to Example 1, but in this case using 9.1 weight parts of a silicone resin having the formula

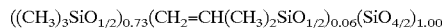

$((CH_3)_3SiO_{1/2})_{0.73}(CH_2=CH(CH_3)_2SiO_{1/2})_{0.06}(SiO_{4/2})_{1.00}$ as component (C) in place of the vinyldimethylsilylated polymethylsilsesquioxane of Reference Example 1. The release resistance was measured on the cured release coating prepared from this composition, and the results are reported in Table 1.

Comparative Example 2

A silicone release coating composition was prepared according to Example 2, but in this case using 20 weight parts of the silicone resin described in Comparative Example 1 as component (C) in place of the vinyldimethylsilylated polymethylsilsesquioxane of Reference Example 1. The release resistance was measured on the cured release coating prepared from this composition, and the results are reported in Table 1.

TABLE 1

| | temperature of release paper aging | release resistance g/5 cm$^a$ |
|---|---|---|
| Example 1 | room temperature | 38 |
| | 70° C. | 29 |
| Example 2 | room temperature | 42 |
| | 70° C. | 36 |
| Comparative Example 1 | room temperature | 48 |
| | 70° C. | 26 |
| Comparative Example 2 | room temperature | 61 |
| | 70° C. | 32 | a: Peeling rate = 0.3 m/minute

There was a large difference in release resistance values between release paper aging at room temperature and 70° C. in Comparative Examples 1 and 2 (differences of 22 g and 29 g, respectively), but this difference was very low in Examples 1 and 2 at 9 g and 6 g, respectively. These results That which is claimed is:

1. A silicone release coating composition comprising:
   (A) 100 weight parts of an organopolysiloxane having a viscosity at 25° C. of at least 40 millipascal-seconds and having at least 2 crosslinkable carbon-carbon double bonds in each molecule;
   (B) 0.5 to 20 weight parts of an organopolysiloxane having a viscosity at 25° C. of 1 to 1,000 mPa.s and having at least 2 silicon-bonded hydrogen atoms in each molecule;
   (C) 1 to 90 weight parts of a silylated polymethylsilsesquioxane obtained by a method comprising silylating a starting polymethylsilsesquioxane having a predetermined number average molecular weight, Mn, from 380 to 2,000 as determined by gel permeation chromatography calibrated with polystyrene standards, said starting polymethylsilsesquioxane having the formula $(CH_3SiO_{3/2})_n(CH_3Si(OH)O_{2/2})_m$ wherein m and n are positive numbers that provide the predetermined Mn, with the proviso that the value of m/(m+n) is less than or equal to $0.152/(Mn \times 10^{-3})+0.10$ and greater than or equal to $0.034/(Mn \times 10^{-3})$, said silylated polymethylsilsesquioxane having the formula $(CH_3SiO_{3/2})_n(CH_3Si(OH)O_{2/2})_{m-k}(CH_3Si(OSiR^1R^2R^3)O_{2/2})_k$ wherein k is a positive number less than m, (m−k)/(m+n) is less than or equal to 0.12, and $R^1$, $R^2$, and $R^3$ are each selected from substituted and unsubstituted monovalent hydrocarbon groups wherein at least 1 of said $R^1$, $R^2$, and $R^3$ is a group containing a crosslinkable carbon-carbon double bond; and
   (D) a catalytic quantity of a platinum catalyst.

2. A composition according to claim 1, wherein (A) comprises a monomer unit having the formula $R^8_aR^9_bSiO_{(4-a-b)/2}$ in which $R^8$ denotes a crosslinkable C=C-functional monovalent hydrocarbon group, $R^9$ denotes monovalent hydrocarbon groups free of crosslinkable carbon-carbon double bonds, a is a number that provides at least two $R^8$ groups in each molecule, and $1.8 \leq a+b \leq 2.3$.

3. A composition according to claim 2, wherein $R^8$ is selected from the group consisting of vinyl and hexenyl and $R^9$ is selected from the group consisting of methyl and phenyl.

4. A composition according to claim 1, wherein (A) is selected from the group consisting of trimethylsiloxy-terminated dimethylsiloxane-methylvinylsiloxane copolymers, vinyldimethylsiloxy-terminated dimethylsiloxane-methylvinylsiloxane copolymers, trimethylsiloxy-terminated dimethylsiloxane-methylhexenylsiloxane copolymers, hexenyldimethylsiloxy-terminated dimethylsiloxane-methylhexenylsiloxane copolymers, dimethylsiloxane-methylvinylsiloxane-methylphenylsiloxane copolymers, hexenyldimethylsiloxy-terminated dimethylsiloxane-methylhexenylsiloxane-methylphenylsiloxane copolymers, trimethylsiloxy-terminated dimethylsiloxane-methylhexenylsiloxane-methylphenylsiloxane copolymers, vinyldimethylsiloxy-terminated dimethylpolysiloxanes, and hexenyldimethylsiloxy-terminated dimethylpolysiloxanes.

5. A composition according to claim 1, wherein (B) comprises a monomer unit having the formula $H_cR^{10}_dSiO_{(4-c-d)/2}$ wherein $R^{10}$ denotes a monovalent hydrocarbon group, c is a number that provides at least two hydrogen atoms in each molecule, and $1.8 \leq c+d \leq 2.3$.

6. A composition according to claim 5, wherein $R^{10}$ is selected from the group consisting of methyl and phenyl.

7. A composition according to claim 1, wherein (B) is selected from the group consisting of dimethylhydrogensiloxy-terminated dimethylsiloxane-methylhydrogensiloxane copolymers, trimethylsiloxy-terminated dimethylsiloxane-methylhydrogensiloxane copolymers, trimethylsiloxy-terminated methylhydrogenpolysiloxanes, cyclic methylhydrogensiloxanes, and copolymers comprising methylhydrogensiloxy units and $SiO_2$ units.

8. A composition according to claim 1, wherein $R^1$ and $R^2$ are methyl, and $R^3$ is selected from the group consisting of vinyl and 5-hexenyl.

9. A composition according to claim 1, wherein (D) is selected from the group consisting of chloroplatinic acid, diketone complexes of chloroplatinic acid, olefin complexes of chloroplatinic acid, alcohol-modified chloroplatinic acid, microfinely divided platinum on a silica carrier, platinum-divinyltetramethyldisiloxane complexes, and platinum on carbon.

10. A composition according to claim 1, wherein the composition further comprises a silylated polymethylsilsesquioxane having the formula $(CH_3SiO_{3/2})_n(CH_3Si(OH)O_{2/2})_{m-p}(CH_3Si(OSiR^4R^5R^6)O_{2/2})_p$ wherein p is a positive number less than m, the quantity of residual silanol as calculated by (m−p)/(m+n) is less than or equal to 0.12, and $R^4$, $R^5$, and $R^6$ are selected from the group consisting of a hydrogen atom, substituted monovalent hydrocarbon groups, and unsubstituted monovalent hydrocarbon groups, with the proviso that at least one of $R^4$, $R^5$, and $R^6$ is a hydrogen atom.

11. A composition according to claim 10, wherein $R^4$ and $R^5$ are methyl and $R^6$ is a hydrogen atom.

12. A composition according to claim 1, wherein the composition further comprises a curing reaction inhibitor and optionally an organic solvent.

13. A composition according to claim 12, wherein the curing reaction inhibitor is selected from the group consisting of alkyne alcohols, ene-yne compounds, tetramethyltetrahexenylcyclotetrasiloxane, and benzotriazole.

14. A composition according to claim 10, wherein the composition further comprises a curing reaction inhibitor and optionally an organic solvent.

15. A silicone release coating composition obtained by a method comprising:
    (I) mixing
    (A) 100 weight parts of an organopolysiloxane having a viscosity at 25° C. of at least 40 millipascal-seconds and having at least 2 crosslinkable carbon-carbon double bonds in each molecule;
    (B) 0.5 to 20 weight parts of an organopolysiloxane having a viscosity at 25° C. of 1 to 1,000 mPa.s and having at least 2 silicon-bonded hydrogen atoms in each molecule;
    (C) 1 to 90 weight parts of a silylated polymethylsilsesquioxane obtained by a method comprising silylating a starting polymethylsilsesquioxane having a predetermined number average molecular weight, Mn, from 380 to 2,000 as determined by gel permeation chromatography calibrated with polystyrene standards, said starting polymethylsilsesquioxane having the formula $(CH_3SiO_{3/2})_n(CH_3Si(OH)O_{2/2})_m$ wherein m and n are positive numbers that provide the predetermined Mn, with the proviso that the value of m/(m+n) is less than or equal to $0.152/(Mn \times 10^{-3})+0.10$ and greater than or equal to $0.034/(Mn \times 10^{-3})$, said silylated polymethylsilsesquioxane having the formula $(CH_3SiO_{3/2})_n(CH_3Si(OH)O_{2/2})_{m-k}(CH_3Si(OSiR^1R^2R^3)O_{2/2})_k$ wherein k is a positive number less than m, (m−k)/(m+n) is less than or equal to 0.12, and $R^1$, $R^2$, and $R^3$ are each selected from substituted and unsubstituted monovalent hydrocarbon groups wherein at least 1 of said $R^1$, $R^2$, and $R^3$ is a group containing a crosslinkable carbon-carbon double bond; and (D) a catalytic quantity of a platinum catalyst.

16. A composition according to claim 15, wherein (A) is selected from the group consisting of trimethylsiloxy-terminated dimethylsiloxane-methylvinylsiloxane copolymers, vinyldimethylsiloxy-terminated dimethylsiloxane-methylvinylsiloxane copolymers, trimethylsiloxy-terminated dimethylsiloxane-methylhexenylsiloxane copolymers, hexenyldimethylsiloxy-terminated dimethylsiloxane-methylhexenylsiloxane copolymers, dimethylsiloxane-methylvinylsiloxane-methylphenylsiloxane copolymers, hexenyldimethylsiloxy-terminated dimethylsiloxane-methylhexenylsiloxane-methylphenylsiloxane copolymers, trimethylsiloxy-terminated dimethylsiloxane-methylhexenylsiloxane-methylphenylsiloxane copolymers, vinyldimethylsiloxy-terminated dimethylpolysiloxanes, and hexenyldimethylsiloxy-terminated dimethylpolysiloxanes.

17. A composition according to claim 15, wherein (B) is selected from the group consisting of dimethylhydrogensiloxy-terminated dimethylsiloxane-methylhydrogensiloxy copolymers, trimethylsiloxy-terminated dimethylsiloxane-methylhydrogensiloxane copolymers, trimethylsiloxy-terminated methylhydrogenpolysiloxanes, cyclic methylhydrogensiloxanes, and copolymers comprising methylhydrogensiloxy units and $SiO_2$ units.

18. A composition according to claim 15, wherein $R^1$ and $R^2$ are methyl, and $R^3$ is selected from the group consisting of vinyl and 5-hexenyl.

19. A composition according to claim 15, wherein (D) is selected from the group consisting of chloroplatinic acid, diketone complexes of chloroplatinic acid, olefin complexes of chloroplatinic acid, alcohol-modified chloroplatinic acid, microfinely divided platinum on a silica carrier, platinum-divinyltetramethyldisiloxane complexes, and platinum on carbon.

20. A composition according to claim 15, wherein the method further comprises adding during step (I) a silylated polymethylsilsesquioxane having the formula $(CH_3SiO_{3/2})_n(CH_3Si(OH)O_{2/2})_{m-p}(CH_3Si(OSiR^4R^5R^6)O_{2/2})_p$ wherein p is a positive number less than m, the quantity of residual silanol as calculated by (m−p)/(m+n) is less than or equal to 0.12, and $R^4$, $R^5$, and $R^6$ are selected from the group consisting of a hydrogen atom, substituted monovalent hydrocarbon groups, and unsubstituted monovalent hydrocarbon groups, with the proviso that at least one of $R^4$, $R^5$, and $R^6$ is a hydrogen atom.

21. A composition according to claim 15, wherein the method further comprises adding during step (I) a curing reaction inhibitor and optionally an organic solvent.

22. A composition according to claim 20, wherein the method further comprises adding during step (I) a curing reaction inhibitor and optionally an organic solvent.

23. A treated substrate obtained by a method comprising:

(I) applying a silicone release coating composition to the surface of a substrate wherein the silicone release coating composition comprises:

(A) 100 weight parts of an organopolysiloxane having a viscosity at 25° C. of at least 40 millipascal-seconds and having at least 2 crosslinkable carbon-carbon double bonds in each molecule;

(B) 0.5 to 20 weight parts of an organopolysiloxane having a viscosity at 25° C. of 1 to 1,000 mPa.s and having at least 2 silicon-bonded hydrogen atoms in each molecule;

(C) 1 to 90 weight parts of a silylated polymethylsilsesquioxane obtained by a method comprising silylating a starting polymethylsilsesquioxane having a predetermined number average molecular weight, Mn, from 380 to 2,000 as determined by gel permeation chromatography calibrated with polystyrene standards, said starting polymethylsilsesquioxane having the formula $(CH_3SiO_{3/2})_n(CH_3Si(OH)O_{2/2})_m$ wherein m and n are positive numbers that provide the predetermined Mn, with the proviso that the value of m/(m+n) is less than or equal to $0.152/(Mn \times 10^{-3})+0.10$ and greater than or equal to $0.034/(Mn \times 10^{-3})$, said silylated polymethylsilsesquioxane having the formula $(CH_3SiO_{3/2})_n(CH_3Si(OH)O_{2/2})_{m-k}(CH_3Si(OSiR^1R^2R^3)O_{2/2})_k$ wherein k is a positive number less than m, (m−k)/(m+n) is less than or equal to 0.12, and $R^1$, $R^2$, and $R^3$ are each selected from substituted and unsubstituted monovalent hydrocarbon groups wherein at least 1 of said $R^1$, $R^2$, and $R^3$ is a group containing a crosslinkable carbon-carbon double bond; and (D) a catalytic quantity of a platinum catalyst; and (II) exposing the coating and the substrate to heat in an amount sufficient to cure the coating.

24. A treated substrate according to claim 23, wherein the method further comprises (III) adding a pressure sensitive adhesive to the substrate after step (II).

25. A treated substrate according to claim 23, wherein the silicone release coating composition further comprises a curing reaction inhibitor and optionally an organic solvent.

26. A treated substrate according to claim 24, wherein the silicone release coating composition further comprises a curing reaction inhibitor and optionally an organic solvent.

* * * * *